United States Patent
Iqbal et al.

(10) Patent No.: US 12,360,273 B2
(45) Date of Patent: Jul. 15, 2025

(54) ADAPTIVE NOISE ESTIMATION AND REMOVAL METHOD FOR MICROSEISMIC DATA

(71) Applicant: King Fahd University of Petroleum and Minerals, Dhahran (SA)

(72) Inventors: Naveed Iqbal, Dhahran (SA); Bo Liu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/711,576

(22) Filed: Dec. 12, 2019

(65) Prior Publication Data
US 2021/0181365 A1    Jun. 17, 2021

(51) Int. Cl.
*G01V 1/36* (2006.01)
*G01V 1/18* (2006.01)

(52) U.S. Cl.
CPC .............. *G01V 1/366* (2013.01); *G01V 1/184* (2013.01); *G01V 2210/1232* (2013.01)

(58) Field of Classification Search
None
See application file for complete search history.

(56) References Cited

U.S. PATENT DOCUMENTS

| | | | | |
|---|---|---|---|---|
| 5,971,095 | A * | 10/1999 | Ozbek | G01V 1/364 367/43 |
| 8,077,541 | B2 | 12/2011 | Ronnow | |
| 2007/0187170 | A1 * | 8/2007 | Lien | G01V 1/3808 181/120 |
| 2017/0226838 | A1 * | 8/2017 | Ciezobka | E21B 43/267 |
| 2019/0101662 | A1 | 4/2019 | Ozdemir et al. | |

FOREIGN PATENT DOCUMENTS

CN    1214255 C    8/2005

OTHER PUBLICATIONS

Iqbal et al., "Blind noise estimation and denoising filter for recovery of microquake signals" Exploration Geophysics (Jun. 2019).*
Verdon et al., "Monitoring Carbon Dioxide storage using passive seismic technique," Proceedings of the Institution of the Civil engineers (2011).*
Cheng et al., "Seismicity induced by geological COZ storage: A review", Earth Science Reviews 239 (2023).*

(Continued)

*Primary Examiner* — Hyun D Park
(74) *Attorney, Agent, or Firm* — Oblon, McClelland, Maier & Neustadt, L.L.P.

(57) ABSTRACT

A data-driven linear filtering method to recover microseismic signals from noisy data/observations based on statistics of background noise and observation, which are directly extracted from recorded data without prior statistical knowledge of the microseismic source signal. The method does not depend on any specific underlying noise statistics and works for any type of noise, e.g., uncorrelated (random/white Gaussian), temporally correlated and spatially correlated noises. The method is suitable for microquake data sets that are recorded in contrastive noise environments. The method is demonstrated with both field and synthetic data sets and shows a robust performance.

10 Claims, 16 Drawing Sheets

(56) References Cited

OTHER PUBLICATIONS

Iqbal, et al.; Observation-Driven Method Based on IIR Wiener Filter for Microseismic Data Denoising; Pure and Applied Geophysics; Jan. 2018; 41 Pages.

Iqbal, et al.; Detection and Denoising of Microseismic Events Using Time_Frequency Representation and Tensor Decomposition; IEEE Access; Apr. 27, 2018; 14 Pages.

Iqbal, et al.; Iterative interferometry-based method for picking microseismic events; Journal of Applied Geophysics 140; pp. 52-61; Mar. 16, 2017; 10 Pages.

* cited by examiner

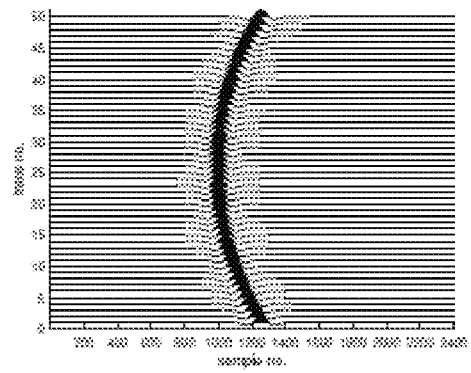
FIG. 8
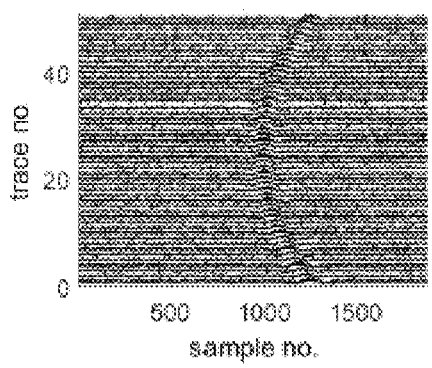 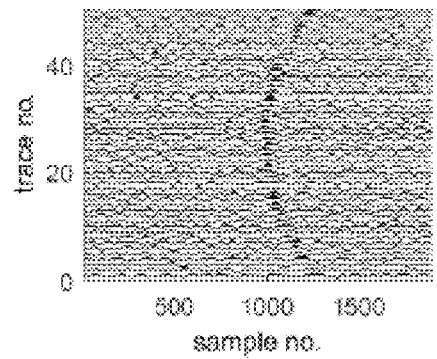
FIG. 9A
FIG. 9B

ADAPTIVE NOISE ESTIMATION AND REMOVAL METHOD FOR MICROSEISMIC DATA

BACKGROUND OF THE INVENTION

Field of the Invention

The present disclosure is directed to a data-driven filtering method to recover microseismic signals from noisy observations.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A microquake (or microearthquake, or microseismic event) is a very low magnitude event, generally 2.0 or less on the moment magnitude scale. In this disclosure, the words microquake and microseismic event are used interchangeably. A microquake occurs as a result of natural tectonic/volcanic activities, or human activities including underground nuclear testing, mining, or geothermal, oil and/or gas production. Microquakes resulting from human activities are also called microtremors. Microseismic event detection and localization have become important tools used in geological carbon dioxide ($CO_2$) storage and in reservoir monitoring for oil and gas (Kendall et al., 2011). See Verdon, J., 2011, Microseismic monitoring and geomechanical modeling of storage in subsurface reservoirs. *GEOPHYSICS*, 76, Z102-Z103; and Kendall, M., Maxwell, S., Foulger, G., Eisner, L., and Lawrence, Z., 2011, Microseismicity: Beyond dots in a box Introduction. *GEOPHYSICS*, 76, WC1-WC3, each incorporated herein by reference in their entirety. It is necessary to monitor the injection process in order to better control the reservoir development. Therefore, identification of microseismic events induced by the injection process is of paramount importance during the reservoir development.

In hydraulic fracturing, also referred to as fracking, there is an increased interest in obtaining more information from signals related to microseismic events in order to characterize the hydraulic fracture process beyond just locations of seismic events. For example, a characteristic feature of a microseismic event that may be of interest is the magnitude or strength of the hydraulic fracture. Another useful characteristic feature may be the polarization and radiation of seismic waves. However, obtaining more information from signals requires acquiring sufficient microseismic signal strength relative to acoustic or electronic noise. Acoustic noise may arise from the ordinary operations in oil fields such as noise for borehole, pumps, and on land surface activities. Also, background seismic noise may vary from site to site.

The monitoring of these microseismic events may be carried out by placing three-component geophones in a nearby production well. See McClellan, J. H., Eisner, L., Liu, E., Iqbal, N., Al-Shuhail, A. A., and Kaka, S. I., 2018, Array Processing in Microseismic Monitoring: Detection, Enhancement, and Localization of Induced Seismicity. *IEEE Signal Processing Magazine*, 35, 99-111, incorporated herein by reference in its entirety. A geophone is a device that converts ground movement (velocity) into voltage. The deviation of this voltage from a baseline is called the seismic response. A three-component geophone (also referred to as a 3C geophone, or 3D geophone) is a geophone that is used to acquire a full wave through the earth in three dimensions. In analog geophone devices, three moving coil elements are mounted in an orthogonal arrangement. Monitoring can also be carried out using similar geophones that are positioned at the surface or in shallow wells. Geophones are much cheaper to employ on the surface and the wider azimuthal coverage provided on the surface allows more accurate horizontal location of microseismic events. In the case of surface arrays, several thousand geophones can be used. See Duncan, P. M., 2012, Microseismic monitoring for unconventional resource development. *Geohorizons*, 26-30, incorporated herein by reference in its entirety. Microquake events recorded in the arrays are characterized by low Signal-to-Noise ratio (SNR). Therefore, one of the challenges in processing the microquake data is to remove/suppress the noise in order to enhance the SNR and to avoid the false picking of microseismic events. See Diaz, J., Gallart, J., and Ruiz, M., 2015, On the Ability of the Benford's Law to Detect Earthquakes and Discriminate Seismic Signals. *Seismological Research Letters*, 86, 192-201; Shemeta, J. and Anderson, P., 2010, It's a matter of size: Magnitude and moment estimates for microseismic data. *The Leading Edge*, 29, 296-302; and Shirzad, T. and Shomali, Z.-H., 2015, Extracting Seismic Body and Rayleigh Waves from the Ambient Seismic Noise Using the rms-Stacking Method. *Seismological Research Letters*, 86,173-180, each incorporated herein by reference in their entirety.

Band pass filtering and spectral filtering are common techniques used for enhancing SNR. However, if the signal and noise share the same frequency content then either one of these methods will result in signal attenuation and/or noise will not be fully removed. However, several other more complicated denoising methods have been proposed. Baziw (2005) and Zhou and Zhang (2012) discussed a particle-filter-based technique to enhance the SNR. See Baziw, E., 2005, Real-Time Seismic Signal Enhancement Utilizing a Hybrid Rao-Blackwellized Particle Filter and Hidden Markov Model Filter. *IEEE Geoscience and Remote Sensing Letters*, 2, 418-422; and Zhou, C. and Zhang, Y., 2012, Particle filter based noise removal method for acoustic emission signals. *Mechanical Systems and Signal Processing*, 28,63-77, each incorporated herein by reference in their entirety. Deng et al. (2015) developed the time-frequency peak filtering with an adaptive preprocessing to deal with the rapid changing of the seismic wavelet. See Deng, X., Ma, H., Li, Y., and Zeng, Q., 2015, Seismic random noise attenuation based on adaptive time-frequency peak filtering. *Journal of Applied Geophysics*, 113,31-37, incorporated herein by reference in its entirety. Furthermore, a threshold is designed to identify the noisy signal as a signal, buffer, or noise. In conventional peak filtering, the Pseudo Wigner-Ville Distribution (PWVD) is used. However, the estimation of the instantaneous frequency using PWVD degrades under noise interference, which disturbs the energy concentration. Zhang et al. (2013) proposed a joint time-frequency distribution by combining the PWVD and smooth PWVD, which effectively suppresses random noise and preserves the events of interest. See Zhang, C., Lin, H.-b., Li, Y., and Yang, B.-j., 2013, Seismic random noise attenuation by time-frequency peak filtering based on joint time-frequency distribution. *Comptes Rendus Geoscience*, 345,383-391, incorporated herein by reference in its entirety. Baziw and Weir-Jones (2002a) presented a Kalman filter that works in real-time and removes a priori statistically known background noise from the seismic data. See Baziw, E. and Weir-Jones, I., 2002, Application of Kalman Filtering Techniques for Microseismic Event Detection. *Pure and Applied Geophysics*, 159, 449-471, incorporated herein by reference in its entirety. Cai et al. (2011) used the generalized S-transform to transform seismic traces to the time-frequency-space (t-f-x) domain. See Cai, H.-P., He, Z.-H., and Huang, D.-J., 2011, Seismic data denoising based on mixed time-frequency methods. *Applied Geophysics*, 8,319-327, incorporated herein by reference in its entirety. Then, the Empirical Mode Decomposition (EMD) is applied on each frequency slice to suppress the coherent and random noise. Vaezi and van der Baan (2014) used power-spectral density approach in order to estimate the self-noise resulting from instrument for borehole data. See Vaezi, Y. and van der Baan, M., 2014, Analysis of instrument self-noise and microseismic event detection using power spectral density estimates. *Geophysical Journal International*, 197,1076-1089, incorporated herein by reference in its entirety. They analyzed temporal changes in the recorded noise and its time-frequency variations for surface and borehole sensors, and concluded that instrument noise limits the detection of an event. Ghael et al. (1997) proposed an algorithm based on wavelet denoising which used a wavelet-shrinkage estimate for designing a wavelet-domain Wiener filter. See Ghael, S. P., Sayeed, A. M., and Baraniuk, R. G., 1997, Improved Wavelet Denoising via Empirical Wiener Filtering. In Aldroubi, A., Larne, A. F., and Unser, M. A., editors, *Proceedings of SPIE—The International Society for Optical Engineering*, 389-399, incorporated herein by reference in its entirety. Lu (2006) proposed an adaptive filter based on singular-value decomposition to enhance the events (non-horizontal) by the detection of seismic image texture direction. See Lu, W., 2006, Adaptive noise attenuation of seismic images based on singular value decomposition and texture direction detection. *Journal of Geophysics and Engineering*, 3,28-34, incorporated herein by reference in its entirety.

Wiener filtering has been known for many decades and is considered to yield the optimum filter in the mean square sense. However, application of Wiener filtering directly to denoising problems in seismic data requires statistical knowledge of the seismic source signal which is not available in reality. Alternatively, noise is estimated using the Wiener filter, which requires the noise statistics. To estimate the statistics of noise, many researchers used the noise-only part of the trace by intuitively finding the location of the seismic source signal. See Coughlin, M., Harms, J., Christensen, N., Dergachev, V., DeSalvo, R., Kandhasamy, S., and Mandic, V., 2014, Wiener filtering with a seismic underground array at the Sanford Underground Research Facility. *Classical and Quantum Gravity*, 31, 215003; Khadhraoui, B. and Özbek, A., 2013, Multicomponent Time-Frequency Noise Attenuation of Microseismic Data. In *75th EAGE Conference and Exhibition incorporating SPE EUROPEC 2013*, 200-204; Mousavi, S. M. and Langston, C. A., 2016, Hybrid Seismic Denoising Using HigherOrder Statistics and Improved Wavelet Block Thresholding. *Bulletin of the Seismological Society of America*, 106, 1380-1393; Wang, J., Tilmann, F., White, R. S., and Bordoni, P., 2009, Application of frequency-dependent multichannel Wiener filters to detect events in 2D three-component seismometer arrays. *GEOPHYSICS*, 74, V133-V141; and Wang, J., Tilmann, F., White, R. S., Soosalu, H., and Bordoni, P., 2008, Application of multichannel Wiener filters to the suppression of ambient seismic noise in passive seismic arrays. *The Leading Edge*, 27, 232-238, each incorporated herein by reference in their entirety. A similar approach is used in other denoising methods using Kalman filtering (Baziw and Weir-Jones, 2002a). However, distinguishing the signal from the noise in microseismic surface monitoring is a challenging task. Another problem with this technique is that it assumes stationarity, i.e., the noise statistics estimated from a noise-only part of the trace is the same as the noise plus signal part of the trace itself. This assumption may not be valid in a non-stationary seismic environment. However, a different approach is to assume a particular type of noise, e.g., white Gaussian noise or model noise as linear/non-linear sweep signal for ground-roll noise elimination. See Aghayan, A., Jaiswal, P., and Siahkoohi, H. R., 2016, Seismic denoising using the redundant lifting scheme. *GEOPHYSICS*, 81, V249-V260; and Karsli, H. and Bayrak, Y., 2008, Ground-roll attenuation based on Wiener filtering and benefits of time-frequency imaging. *The Leading Edge*, 27, 206-209, each incorporated herein by reference in their entirety.

It is one object of the present disclosure to describe an approach to solving the problem of microquake signal recovery. Other objectives include providing a method based on a linear filter to recover seismic signals from noisy observations. In some aspects, the method takes into account that the occurrence of microquakes is spontaneous over time. The method may further take into account prior knowledge of the statistics of the spontaneous microquakes is not available, unlike an active seismic method.

SUMMARY

In an exemplary embodiment, a method of monitoring microseismic activity, includes recording, by surface-mounted geophones, seismic observation data; iteratively performing, by processing circuitry estimating an observation correlation matrix by dividing the seismic observation data into data segments of length N, determining correlation elements by sliding a correlation estimation window (CEW) of length L and a filter design window (FDW) of length N, N<L, over the seismic observation data, where N and L are natural numbers, and summing correlations of a data element in one of the data segments of length N for each data segment in the CEW to obtain the observation correlation matrix as a matrix of N×N observation correlation elements; estimating a noise correlation matrix using the seismic observation data converted to a frequency-domain while sliding the CEW and the FDW over the seismic observation data to obtain a matrix of N×N noise correlation elements; structuring a linear filter for each CEW based on a difference between the observation correlation matrix and the noise correlation matrix; recovering seismic signals by applying the linear filter to the seismic observation data; and displaying the seismic observation data and the recovered seismic signals as an indication of the microseismic activity.

In another exemplary embodiment, a system for monitoring microseismic activity, includes a plurality of surface-mounted geophones to record seismic observation data; processing circuitry configured to iteratively perform estimating an observation correlation matrix by dividing the seismic observation data into segments of length N and determining correlation elements by sliding a correlation estimation window (CEW) of length L and a filter design window (FDW) of length N, N<L, over the seismic observation data, where N and L are natural numbers, summing correlations of a data element in one of the data segments of length N for each data segment in the CEW to obtain the observation correlation matrix as a matrix of N×N observation correlation elements; estimating a noise correlation matrix using the seismic observation data converted to a frequency-domain while sliding the CEW and the FDW over the seismic observation data to obtain a matrix of N×N noise correlation elements; structuring a linear filter for each CEW based on a difference between the observation correlation matrix and the noise correlation matrix; recovering seismic signals by applying the linear filter to the seismic observation data; and displaying the seismic observation data and the recovered seismic signals as an indication of the microseismic event.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 illustrates noiseless synthetic data;

FIGS. 9A and 9B illustrate synthetic data sets with (a) random (white Gaussian noise), (b) correlated noise;

DETAILED DESCRIPTION

Figure 1:
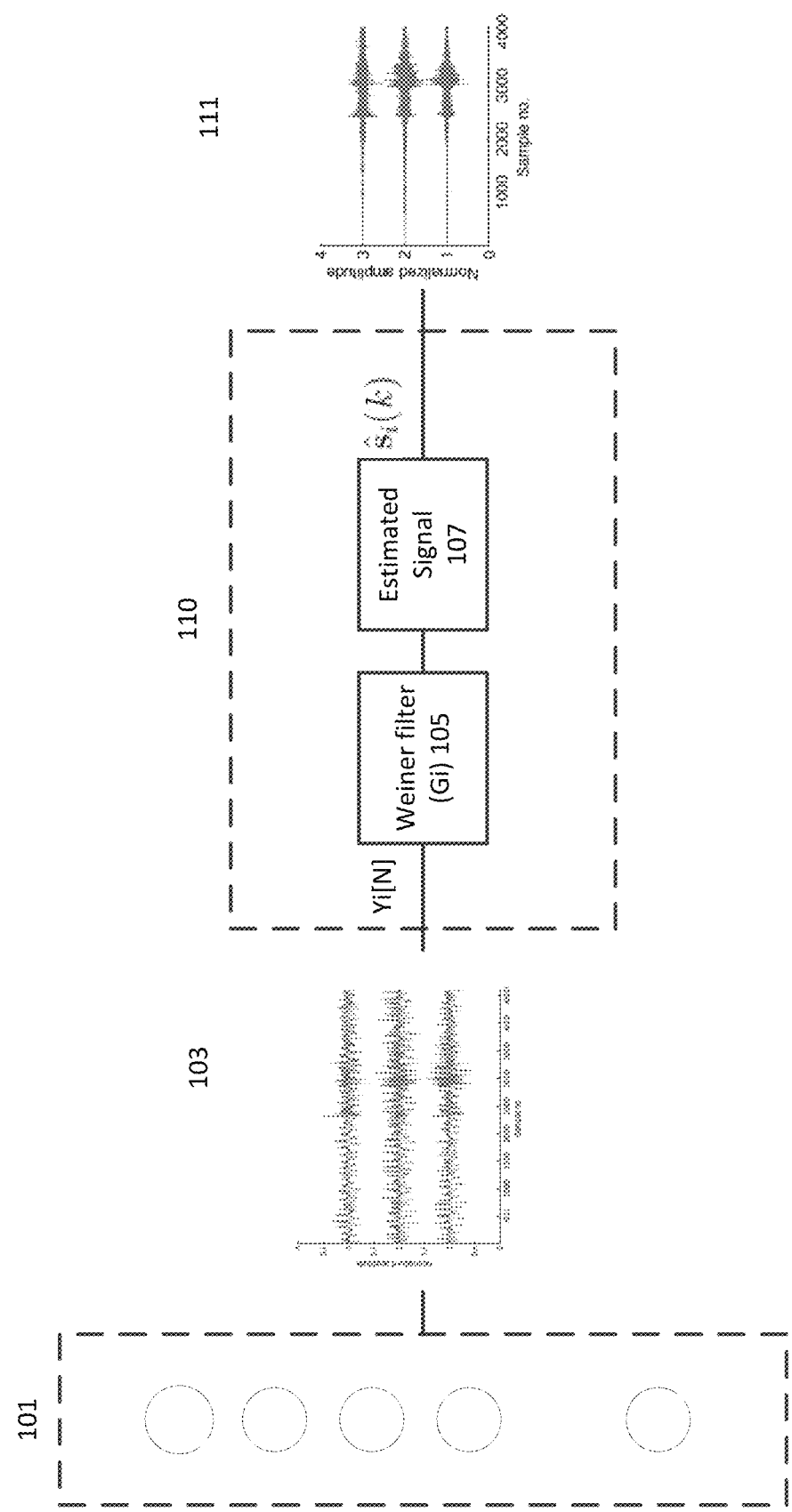
FIG. 1 is a block diagram of a Weiner filter system for recovering microseismic signals from noisy observations in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Microquakes are characterized by very low energy intensity. They occur either naturally or as a result of underground industrial processes. Typical microseismic event data feature low intensity and high non-stationary noisy environments. Removing noise will drastically improve seismogram composition studies, signal detection, and source discrimination for small regional/local seismic sources. One of the common methods for SNR enhancement is the cross-correlation of the seismic recorded by geophone arrays.

Aspects of this disclosure are directed to a data-driven method to denoise microseismic event traces, e.g., seismic events such as microquakes having an intensity of 0.05-2.0, preferably 0.01-1.5, 0.05-1.0, or 0.1-0.5 on the moment magnitude scale. In order to isolate the noise from the signal, knowledge of the second order statistics of the noise and the noisy signal is needed. Since the microseismic events are known to be sporadic, these statistics are estimated from the observed/received data set within a suitable length of the data window. The present disclosure describes a method that estimates the microseismic event signal using a linear Wiener filter gain is equivalent, in terms of squared estimation error, to removing the estimated noise with a linear Wiener filter gain. This strategy makes sense for the microquake denoising techniques of the present disclosure since it is usually possible to estimate the correlation of the noise but not those of the microseismic event signal. The correlation estimate obtained separately from each trace is suitable for a single geophone case (e.g., microquake recorded by a single receiver/station) and also for parallel processing in the case of geophone array. Furthermore, the correlation estimate is improved by stacking multiple traces recorded by a geophone array (no need for alignment as the disclosed method uses autocorrelation). Another advantage of using the disclosed method for denoising is that it does not impose any assumption on the correlation of noise, which makes it suitable to be applied for diverse data conditions. Microquake or microseismic event signals are used in order to demonstrate the effectiveness of the disclosed method under very high noise scenarios. However, the disclosed method is equally applicable to earthquakes with high magnitudes and to active seismic data. Testing of the disclosed method on synthetic microquake data sets with both correlated and uncorrelated noise shows its superior performance compared to other denoising methods. The filter is applied iteratively in order to yield the best results by improving SNR in each iteration.

The disclosed approach to microquake signal recovery has application in areas such as monitoring of fracking, monitoring storage of geological carbon dioxide ($CO_2$) and monitoring an oil and/or gas reservoir. The disclosed approach may be applied to determine the extent to which the $CO_2$ moves within a geologic formation, and when $CO_2$ is injected, what physical and chemical changes occur within the formation. This information is useful to ensure that carbon storage will not affect the structural integrity of an underground formation, and that $CO_2$ storage is secure and environmentally acceptable.

In some cases, production from an oil or natural gas reservoir can be enhanced by pumping $CO_2$ into the reservoir to push out the product, which is called enhanced oil recovery. Enhanced oil recovery uses man-made $CO_2$ to recover additional oil while permanently storing $CO_2$ in the formation. Recovered microquake signals may be used to assess and minimize the impacts of $CO_2$ on geophysical processes, and improve understanding of injectivity.

FIG. 1 is a block diagram of a system for recovering microseismic event signals from noisy seismic observation data. The system may include one or more three-component geophones 101 that send their respective three component seismic observation signal 103 to a computer system 110. The computer system 110 includes a Weiner filter 105 that generates respective estimated denoised signals 107 for each component. The system may include a display device 111 to display the estimated denoised signals.

Figure 2:
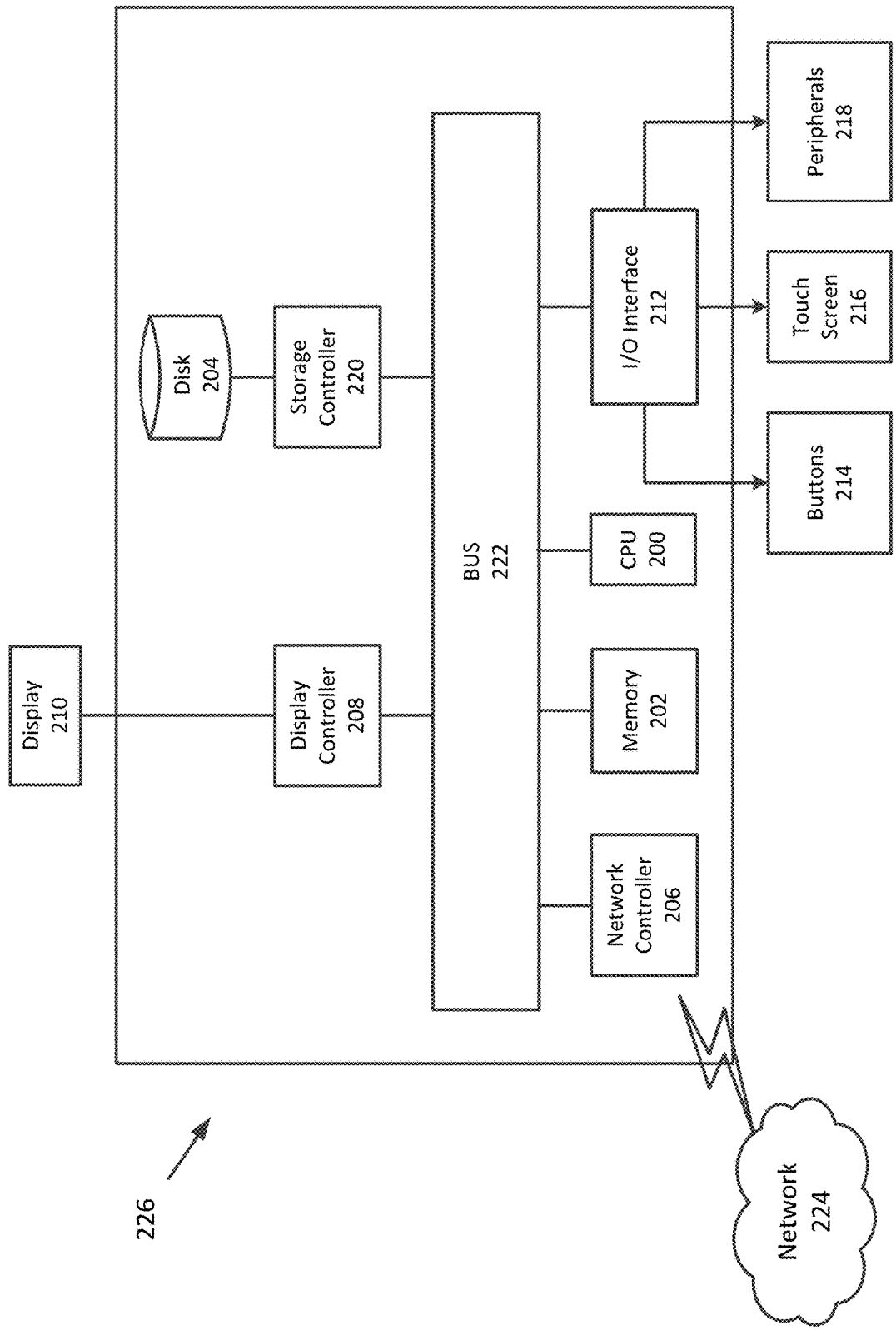
FIG. 2 is an exemplary computer system for performing the Weiner filter.

In one implementation, the functions and processes of the computer system 110 may be implemented by a computer 226. Next, a hardware description of the computer 226 according to exemplary embodiments is described with reference to FIG. 2. In FIG. 2, the computer 226 includes a CPU 200 which performs the processes described herein. The process data and instructions may be stored in memory 202. These processes and instructions may also be stored on a storage medium disk 204 such as a hard drive (HDD) or portable storage medium or may be stored remotely. Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 226 communicates, such as a server or computer.

Further, the method and system of the present disclosure may be provided as a utility application, background daemon, or component of an operating system, or combination thereof, executing in conjunction with CPU 200 and an operating system such as Microsoft® Windows®, UNIX®, Oracle® Solaris, LINUX®, Apple macOS® and other systems known to those skilled in the art.

In the computer 226, the hardware elements may be realized by various circuitry elements, known to those skilled in the art. For example, CPU 200 may be a Xenon® or Core® processor from Intel Corporation of America or an Opteron® processor from AMD of America, or may be other processor types that would be recognized by one of ordinary skill in the art. Alternatively, the CPU 200 may be implemented on an FPGA, ASIC, PLD or using discrete logic circuits, as one of ordinary skill in the art would recognize. Further, CPU 200 may be implemented as multiple processors cooperatively working in parallel to perform the instructions of the inventive processes described above.

The computer 226 in FIG. 2 also includes a network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 226 further includes a display controller 208, such as a NVIDIA® GeForce® GTX or Quadro® graphics adaptor from NVIDIA Corporation of America for interfacing with display 210, such as a Hewlett Packard® HPL2445w LCD monitor. A general purpose I/O interface 212 interfaces with a keyboard and/or mouse 214 as well as an optional touch screen panel 216 on or separate from display 210. General purpose I/O interface also connects to a variety of peripherals 218 including printers and scanners, such as an OfficeJet® or DeskJet® from Hewlett Packard®.

The general purpose storage controller 220 connects the storage medium disk 204 with communication bus 222, which may be an ISA, EISA, VESA, PCI, or similar, for interconnecting all of the components of the computer 226. A description of the general features and functionality of the display 210, keyboard and/or mouse 214, as well as the display controller 208, storage controller 220, network controller 206, and general purpose I/O interface 212 is omitted herein for brevity as these features are known.

In this disclosure, a linear filter is formulated hinging on the autocorrelations of the observation and noise (which is obtained from the recorded data set). The autocorrelation is obtained from the observation without prior knowledge of the microquake signal and/or noise (assuming a noise-only portion of the trace for noise statistics calculation) or using wavelet transform. An improved system is disclosed that estimates noise and observation autocorrelation by defining two windows, a filter design window and a correlation estimate window. The disclosed system gives promising performance for a microseismic event data set having very low SNR. Thus, the disclosed system is suitable to be used for microseismic event data set recorded by the geophone array placed on the surface. Since in the derivation of the filter, no assumption is made on the type of noise, the disclosed system is suitable for a data with uncorrelated, correlated, or coherent noise.

There are methods that rely on multiple observations (traces), like correlation based method or dimensionality reduction based methods. See Iqbal, N., Al-Shuhail, A. A., Kaka, S. I., Liu, E., Raj, A. G., and McClellan, J. H, 2017, Iterative interferometry-based method for picking microseismic events. *Journal of Applied Geophysics*, 140, 52-61; Liu, E., Zhu, L., Govinda Raj, A., McClellan, J. H., Al-Shuhail, A., Kaka, S. I., and Iqbal, N., 2017, Microseismic events enhancement and detection in sensor arrays using autocorrelation-based filtering. *Geophysical Prospecting*, 65, 1496-1509; Iqbal, N., Liu, E., McClellan, J., Al-Shuhail, A., Kaka, S., and Zerguine, A., 2017, Enhancement of Microseismic Events Using Tensor Decomposition and Time-frequency Representation. In *79th EAGE Conference and Exhibition* 2017; and Iqbal, N., Liu, E., McClellan, J. H., Al-Shuhail, A., Kaka, S. I., and Zerguine, A., 2018, Detection and Denoising of Microseismic Events Using TimeFrequency Representation and Tensor Decomposition. *IEEE Access*, 6, 22993-23006, each incorporated herein by reference in their entirety. On the other hand, there are methods that do not make use of multiple observations (traces). See Mousavi, S. M. and Langston, C. A., 2016, Adaptive noise estimation and suppression for improving microseismic event detection. *Journal of Applied Geophysics*, 132, 116-124; Mousavi, S. M. and Langston, C. A., 2016, Hybrid Seismic Denoising Using HigherOrder Statistics and Improved Wavelet Block Thresholding. *Bulletin of the Seismological Society of America,* 106, 1380-1393; Mousavi, S. M. and Langston, C. A., 2017, Automatic noise-removal/signal-removal based on general cross-validation thresholding in synchrosqueezed domain and its application on earthquake data. *GEOPHYSICS,* 82, V211-V227; and Mousavi, S. M., Langston, C. A., and Horton, S. P., 2016, Automatic microseismic denoising and onset detection using the synchrosqueezed continuous wavelet transform. *GEOPHYSICS,* 81, V341-V355, each incorporated herein by reference in their entirety.

The disclosed system and method perform well for the single trace case, moreover, the performance gets better when multiple observations are considered. In other words, the disclosed system fits in both scenarios. An alternative method is described in Iqbal, N., Zerguine, A., Kaka, S., and Al-Shuhail, A., 2018, Observation-Driven Method Based on IIR Wiener Filter for Microseismic Data Denoising. *Pure and Applied Geophysics,* 175, 2057-2075, incorporated herein by reference in its entirety.

The disclosed system and method may be used to re-evaluate seismic observation data that has been analyzed using other methods. The disclosed system and method may determine the presence of microseismic events that other methods had missed. Also, although some embodiments are performed using an array of three component geophones placed on the surface of an area of interest, the disclosed system and method may be applied with geophones placed in boreholes, or in combinations of some geophones placed in boreholes and other geophones placed on the surface using any of various arrangements.

Notation: The following notation is used in this disclosure: A scalar quantity is represented by a lowercase letter x, a vector is denoted by a bold lowercase letter x, a matrix is represented by bold capital letter X, and a frequency-domain vector is specified by calligraphic letter X.

The following section describes the filter design. In a later section, an approach for estimating the correlation matrices needed for the disclosed system is presented. Finally, some exemplary implementations using both synthetic data and field data sets are disclosed to discuss the performance of the disclosed system.

Wiener Filter for Microseismic Signal Recovery

In this section, the Wiener filter is described as a basis for estimating the microquake signal from the noisy recorded data set (observations). Then, an alternative structure is provided for the filter.

Wiener Filter

Figure 3:
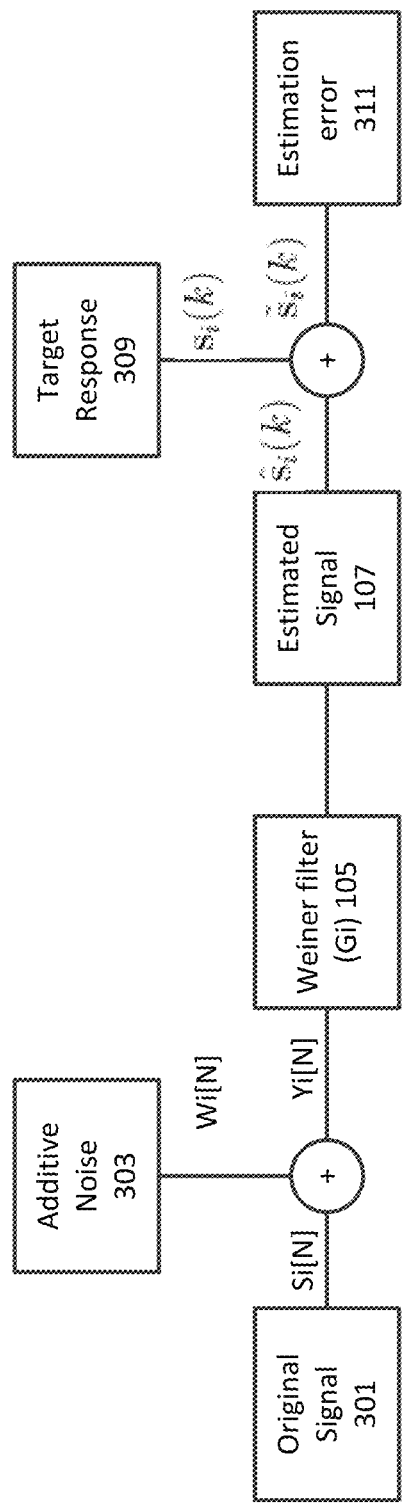
FIG. 3 is a block diagram for a Weiner filter in accordance with an exemplary aspect of the disclosure.

A Wiener filter is a filter used to statistically estimate a target random process from a noisy seismic trace, usually in the case of additive noise and assumes a stationary signal and noise spectra, and additive noise. The Weiner filter minimizes the mean square error between the estimated random process and the target process. FIG. 3 is a block diagram for a procedure for designing the Weiner filter in accordance with an exemplary aspect of the disclosure. A known noisy signal Yi might consist of an unknown original signal 301 that has been corrupted by additive noise 303. The Wiener filter 105 may be used to filter out the noise from the corrupted signal Yi to generate an estimated signal 107 as an estimate of the underlying signal of interest. It may be assumed that the original signal 301 and additive noise 303 are stationary linear stochastic processes with known autocorrelation. The Wiener filter 105 is typically designed by minimizing mean-square error. The error 311 is the difference between the output 107 of the Wiener filter and a target response signal 309.

Iterative Procedure

Figure 4:
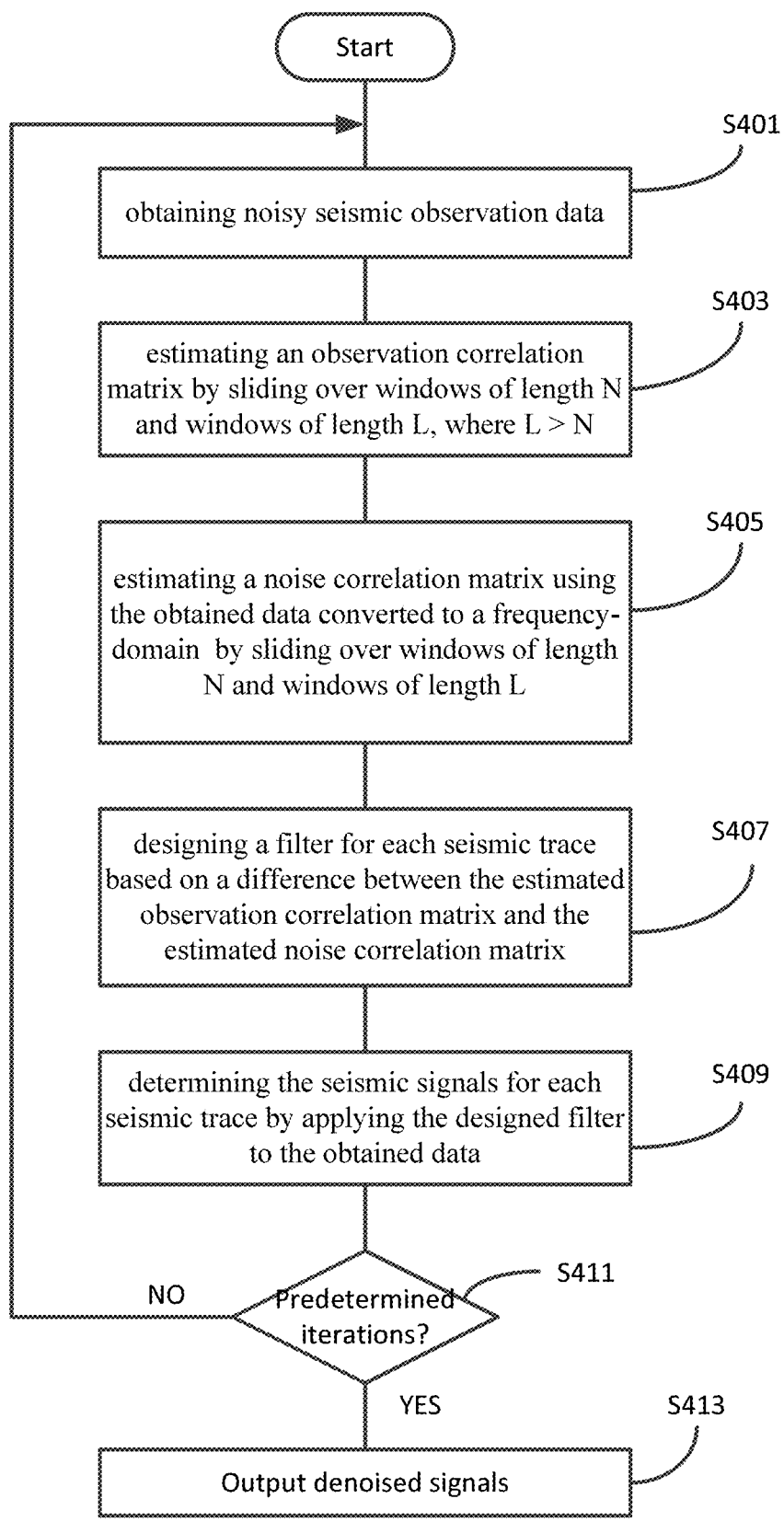
FIG. 4 is a flowchart of an iterative procedure for denoising noisy seismic observation signals in accordance with an exemplary aspect of the disclosure.

FIG. 4 is a flowchart of an iterative procedure for denoising noisy seismic observation signals in accordance with an exemplary aspect of the disclosure. In order to achieve the best performance of the disclosed system, the denoising procedure may be applied in an iterative fashion. In particular, the filter is applied on all the traces, then the filtered traces are again passed through the filter. The procedure is performed by a computer system 110 which continues performing the procedure for a predetermined number of iterations. The predetermined number of iterations may be set based on the capability of the computer system 110 and the desired time period for obtaining a denoised signal, and may be obtained through experimentation.

The procedure of denoising includes, in S401, obtaining noisy seismic observation data from the three component geophones 101. In S403, the computer system 110 estimates an observation correlation matrix by dividing the obtained data into windows of length N and windows of length L>N and applying a Wiener filter 105 as each window slides over the data. In S405, the computer system 110 estimates a noise correlation matrix using the obtained data converted to a frequency-domain while sliding over the windows of length L. In S407, the computer system 110 designs the filter 105 for each seismic trace based on a difference between the estimated observation correlation matrix and the estimated noise correlation matrix. In S409, the computer system 110 may determine the estimated seismic signals 111 by applying the designed filter 105 to the obtained data 103. In S411, a decision is made whether the procedure has repeated for the predetermined number of iterations. Alternatively, in a non-limiting procedure, the procedure may be repeated until the estimation error is below a predefined threshold. In S413, the denoised signals may be output, for example, for display on a display device 210.

Filter Derivation

To obtain a seismic trace, M geophone sensors may be positioned on the ground to collect the microseismic data set. The geophone sensors may be arranged in a pattern to collect data for a single site or for multiple sites. In one embodiment, the geophone sensors may be arranged in a star pattern with radial arms extending from the center of each site. From each sensor a time series of sampled measurement, i.e., a microseismic trace, $y_i(k)$, is collected. The noisy-observation can be represented by the following model:

$$y_i(k) = s_i(k) + w_i(k), \tag{1}$$

where subscript in Eq. (1) i=1, 2, . . . ; M, $s_i(k)$ represents the signal sample and $w_i(k)$ is the $i^{th}$ trace noise sample at instant t=kT, and T is the sampling interval. The noise and signal are assumed to be uncorrelated. For the sake of simplicity, the time series $y_i(k)$, $s_i(k)$, and $w_i(k)$ are stacked into windows of length N as follows:

$$s_i(k) = [s_i(k), s_i(k+1), \ldots, s_i(k+N-1)]^T \tag{2}$$

$$w_i(k) = [w_i(k), w_i(k+1), \ldots, w_i(k+N-1)]^T \tag{3}$$

$$y_i(k) = [y_i(k), y_i(k+1), \ldots, y_i(k+N-1)]^T \tag{4}$$

In some embodiments, a filter $G_i(k) \in \mathbb{R}^{n \times n}$ is provided for each trace and estimates the microseismic event signal $s_i(k)$ as a linear transformation of the sampled measurement $y_i(k)$ as $$\hat{s}(k) = G_i(k) y_i(k) \tag{5}$$

The Mean-Squared Error (MSE) cost function is given as $$J_G(k) = E\{\tilde{s}_i^T(k)\tilde{s}_i(k)\} \quad (16)$$

The filter $G_i(k)$ is obtained by minimizing Eq. (6) and $\tilde{s}_i(k) = s_i(k) - \hat{s}_i(k)$ is the estimation error of the signal and notation $E\{\cdot\}$ denotes mathematical expectation. In some embodiments, the Wiener filter is based on an assumption that the process is ergodic, i.e., all of the sample averages converge to true moments. Assuming the process is ergodic, the expectations may be calculated by averaging time samples of a trace. Later, it will be shown that the expectation estimation improves if after averaging time samples of a trace, the expectation estimation is taken as the averaged of the traces as well. The cross-correlation of the estimated error signal $\tilde{s}_i(k)$ and observation $y_i(k)$ is found as follows $$\begin{aligned}E\{\tilde{s}_i(k)y_i^T(k)\} &= E\{[s_i(k) - \hat{s}_i(k)]y_i^T(k)\} \quad (7)\\&= E\{s_i(k)y_i^T(k) - G_i(k)y_i(k)y_i^T(k)\}\\&= E\{y_i(k)y_i^T(k) - w_i(k)y_i^T(k) -\\&\quad G_i(k)y_i(k)y_i^T(k)\}\\&= E\{y_i(k)y_i^T(k) - w_i(k)s_i^T(k) -\\&\quad w_i(k)w_i^T(k) - G_i(k)y_i(k)y_i^T(k)\}\\&= P_{yy,i}(k) - P_{ws,i}(k) - P_{ww,i}(k) - G_i(k)P_{yy,i}(k)\end{aligned}$$

where $P_{ab,i}(k)$ represents the correlation between signals a and b at the $i^{th}$ trace within time window $[k-N+1, k]$. Note that $P_{ws,i}(k) = 0$, i.e., signal and noise are uncorrelated; thus, Eq. (7) reduces to $$E\{\tilde{s}_i(k)y_i^T(i)\} = P_{yy,i}(k) - P_{ww,i}(k) - G_i(k)P_{yy,i}(k) \quad (8)$$

According to the principle of orthogonality, $E\{\tilde{s}_i(k)y_i^T(i)\} = 0$, i.e., the estimated signal $\hat{s}_i(k)$ that minimizes the MSE $J_G(k)$ given in Eq. (6) is the orthogonal projection of $\tilde{s}_i(k)$ into the space spanned by the observations, which yields $$G_i(k) = [P_{yy,i}(k) - P_{ww,i}(k)]P_{yy,i}^{-1}(k) \quad (9)$$

An alternative solution of $G_i(k)$ is $P_{sy,i}(k)P_{yy,i}^{-1}(k)$ is theoretically equivalent to Eq. (9), where $P_{sy,i}(k)$ is a correlation matrix between signal and noisy observation. However, the alternative solution requires the statistics of the microseismic event signal, which may not be practical.

Because the signals are non-stationary, they are segmented in quasi-stationary short segments of length N each.

Mathematical Analysis

Another approach to interpret the filter $G_i(k)$; as in Eq. (5), as follows. Suppose a filter $H(k)$ is designed to estimate the noise $\hat{w}_i(k)$ and is given by $$\hat{w}_i(k) = H_i(k)y_i(k) \quad (10)$$

Now, minimize the MSE of the following cost function:

$$J_H(k) = E\{\tilde{w}_i(k)^T \tilde{w}_i(k)\} \quad (11)$$

where $\tilde{w}_i(k) = w_i(k) - \hat{w}_i(k)$ is the estimation error of the noise. Similarly, applying the principle of orthogonality to this formulation yields the solution $$H_i(k) = P_{ww,i}(k)P_{yy,i}^{-1}(k) \quad (12)$$

Comparing $H_i(k)$ in Eq. (12) with $G_i(k)$ in Eq. (9), shows that $$G_i(k) = I_N - H_i(k) \quad (13)$$

where $I_N$ is an identity matrix of size N×N.

Let $\sigma_s^2$ and $\sigma_w^2$ denote the variances of the signal and the noise, respectively, then the SNR is given by the following expression:

$$SNR = \frac{\sigma_s^2}{\sigma_w^2} \quad (14)$$

Then, the filter gain $H_i(k)$ can be formulated as follows:

$$\begin{aligned}H_i(k) &= P_{ww,i}(k)P_{yy,i}^{-1}(k) \quad (15)\\&= P_{ww,i}(k)[P_{ss,i}(k) + P_{ww,i}(k)]^{-1}\\&= \tilde{P}_{ww,i}(k)[SNR \cdot \tilde{P}_{ss,i}(k) + \tilde{P}_{ww,i}(k)]^{-1}\end{aligned}$$

where $$\tilde{P}_{ss,i}(k) = \frac{P_{ss,i}(k)}{\sigma_s^2} = \tilde{P}_{ww,i}(k) = \frac{P_{ww,i}(k)}{\sigma_w^2}.$$

Amalgamating Eq. (13) and Eq. (15) results in $$\lim_{SNR \to \infty} H_i(k) = 0_N \quad \lim_{SNR \to \infty} G_i(k) = I_N \quad (16)$$

$$\lim_{SNR \to 0} H_i(k) = I_N \quad \lim_{SNR \to 0} G_i(k) = 0_N \quad (17)$$

This analysis explains that the Wiener filter for the signal is the complement of the filter for the noise with respect to an identity matrix. The SNR plays a critical role in balancing the strength of these two filter gains. The larger the SNR, the stronger the signal filter and the weaker is the noise filter gain, and vice versa.

Furthermore, substituting Eq. (13) into Eq. (5) gives $$\hat{s}_i(k) = y_i(k) - \hat{w}_i(k) \quad (18)$$

Subsequently, estimating the signal $s_i(k)$ is mathematically equivalent to removing the estimate of the noise, $\hat{w}_i(k)$, from the observations $y_i(k)$. Furthermore, Eq. (6) can be rewritten as $$\begin{aligned}J_G(k) &= E\{[s_i(k) - \hat{s}_i(k)]^T[s_i(k) - \hat{s}_i(k)]\} \quad (19)\\&= E\{[s_i(k) - G_i(k)y_i(k)]^T[s_i(k) - G_i(k)y_i(k)]\}\\&= E\{[H(k)y_i(k) - w_i(k)]^T[H(k)y_i(k) - w_i(k)]\}\\&= J_H(k)\end{aligned}$$

This result reveals a feature in these two filters which translates to optimally estimating the signal is equivalent to optimally estimating the noise in the mean square sense.

Correlation Matrix Estimation

Previously a linear Wiener filtering formulation was presented. In this section, practical applications are addressed.

Observation Correlation Matrix Estimation

Figure 5:
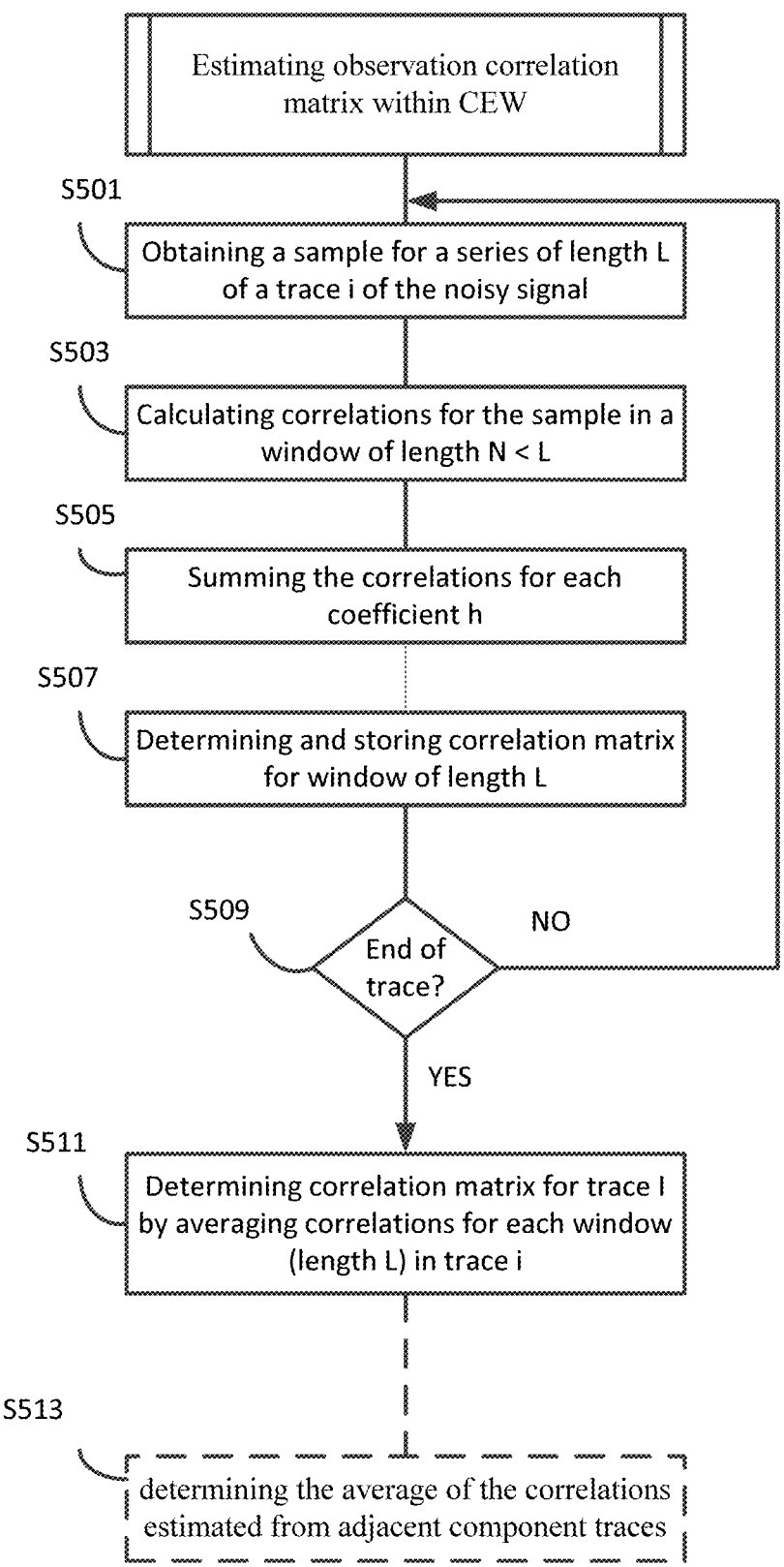
FIG. 5 is a flowchart for estimating the observation correlation matrix.

FIG. 5 is a flowchart for estimating the observation correlation matrix from the observed data set. A typical Wiener filter assumes $y_i(k)$ to be wide-sense stationary signal, i.e. it has constant (and finite) mean and variance, and a correlation function which is a function of time shift only. However, signals from microseismic events are not wide-sense stationary. Therefore instead of taking the whole signal, it is divided into small segments, i.e., a quasi-static assumption is used. It is assumed that within a small segment the microseismic event signal is wide-sense stationary and the Wiener filter may be applied on this segment.

Take the $i^{th}$ trace $y_i(j)$ as an example, the correlation for the observation is calculated as follows:

$$c_{yy,i}^k(h) = \lim_{n \to \infty} \sum_{j=k}^{k+n-1} y_i(j) y_i(j+h) \quad (20)$$

then, in S509, $$P_{yy,i}(k) = \begin{bmatrix} c_{yy,i}^k(0) & c_{yy,i}^k(1) & c_{yy,i}^k(2) & \cdots & c_{yy,i}^k(n-1) \\ c_{yy,i}^k(1) & c_{yy,i}^k(0) & c_{yy,i}^k(1) & \cdots & c_{yy,i}^k(n-2) \\ c_{yy,i}^k(2) & c_{yy,i}^k(1) & c_{yy,i}^k(0) & \cdots & c_{yy,i}^k(n-3) \\ \vdots & \vdots & \vdots & \vdots & \vdots \\ c_{yy,i}^k(n-1) & c_{yy,i}^k(n-2) & c_{yy,i}^k(n-3) & \cdots & c_{yy,i}^k(0) \end{bmatrix} \quad (21)$$

Since the filter is designed with segment N as in Eqs. (2)-(4), the filter requires to obtain $$c_{yy,i}^k(h)$$

from h=0 up to h=N−1.

If the correlation is practically estimated by obtaining a series with a finite length, L (assume k=0 for simplicity), the samples $y_i(j+h)$, for j=L, L+1, ..., L+h, are not available. Subsequently, assigning zero value to these samples would yield $$c_{yy,i}^0(h) = \sum_{j=0}^{L-1} y_i(j) y_i(j+h) = \sum_{j=0}^{L-h-1} y_i(j) y_i(j+h), \quad (22)$$

$$h = 0, 1, \ldots, L-1$$

In this disclosure, Eq. (22) is used to estimate the correlations. From Eq. (22), it can easily be seen that the number of samples used for estimating $$c_{yy,i}^0(h)$$

is L−h, which implies that the accuracy of the estimate $$c_{yy,i}^0(h)$$

may decrease as h increases. To alleviate this drawback, a compromised solution is to use a longer series, i.e., L>>N, to estimate $$c_{yy,i}^0(h)$$

for h=0, ..., N−1, by summing the correlations as follows $$c_{yy,i}^0(h) = \sum_{j=0}^{L-h-1} y_i(j) y_i(j+h), \, h = 0, 1, \ldots, N-1 \quad (23)$$

until h = N − 1 (S507).

However, choosing the value of L presents a dilemma. Although a larger value of L indeed helps in improving the estimation of $$c_{yy,i}^0(h),$$

may lose us sensitivity in capturing the quasi-stationarity by using a very long data segment. In some embodiments, the value of L is chosen based on experimentation. Therefore, the ratio of a filtering window length N to a data window length L should be optimized. For this, a number of experiments have been performed, which are discussed in a later section. For the sake of simplicity, the data window with length N used for designing the filter is denoted as the Filter Design Window (FDW) in the rest of this disclosure, whereas the data window with length L used to estimate the correlations is denoted as the Correlation Estimate Window (CEW).

Regarding FIG. 5, two windows, one of length N and another of length L, slide over each trace in the calculation of the output correlation matrix. In some embodiments, the windows may overlap with adjacent windows. In S501, processing circuitry obtains a sample for a series of length L of a trace I of the noisy signal. In S503, the processing circuitry calculates correlations for the sample in a window of length N<L. In S505, the processing circuitry sums L−h correlations in each matrix element, having coefficient h. It is preferred that the length N is sufficiently small so that each sample is wide-sense stationary. When the correlations have been calculated over a sliding window of length L, in S507, the processing circuitry calculates and stores the correlation matrix for a window of length L. The correlation matrix is an N×N matrix of correlation elements. Correlation matrixes are determined as the windows of length N and L slide over the signal data until the end of a trace is reached (YES in S509).

In S511, the processing circuitry may determine the correlation matrix as the average of the correlations of a trace. In some embodiments, another method to enhance the correlation estimate may be to consider traces as a realization of the same process, then, in S513, the processing circuitry determines the correlation matrix as the average of the correlations estimated from adjacent traces and/or components of 3C sensors (which may be referred to as stacked correlations estimate and individual correlations estimate when no averaging is used). See Caffagni, E., Eaton, D. W., Jones, J. P., and van der Baan, M., 2016, Detection and analysis of microseismic events using a Matched Filtering Algorithm (MFA). *Geophysical Journal International*, 206, 644-658; and Cieplicki, R., Mueller, M., and Eisner, L., 2014, Microseismic event detection: Comparing P-wave migration with P- and S-wave cross-correlation. In *SEG Technical Program Expanded Abstracts* 2014, 2168-2172, each incorporated herein by reference in their entirety.

$$c_{yy,avg}(h) = \frac{1}{3M} \sum_{i=1}^{3M} \sum_{j=1}^{L-h} y_i(j) y_i(j+h), \, h = 0, 1, \ldots, N-1 \quad (24)$$

Noise Correlation Matrix Estimation

Figure 6:
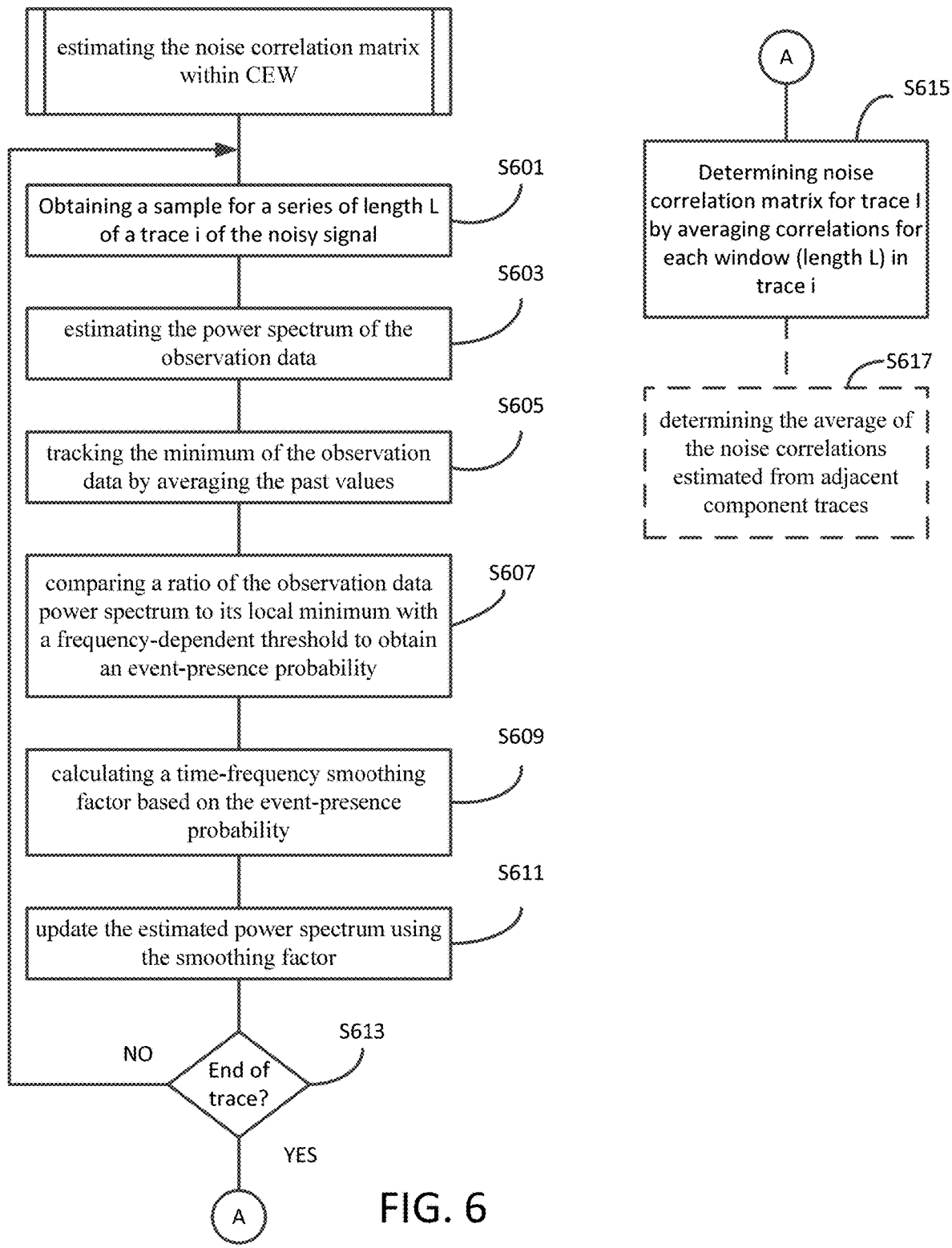
FIG. 6 is a flowchart for estimating the noise correlation matrix.

For estimation of the noise correlation matrix, the approach presented by Rangachari and Loizou (2006) is used. See Rangachari, S. and Loizou, P. C., 2006, A noise-estimation algorithm for highly non-stationary environments. *Speech Communication*, 48,220-231, incorporated herein by reference in its entirety. FIG. 6 is a flowchart for estimating the noise correlation matrix. In some embodiments, the noise correlation matrix is estimated using two sliding windows, the FDW and the CEW. The estimation process may include or consist of the following steps:

In S601, the processing circuitry obtains the sample signal for the noisy observation as a series of length L. In S603, Initial power spectrum estimation: The processing circuitry uses first order recursive relation to estimate the power spectrum of the noisy observation as $$\mathcal{P}_i(\lambda) = \eta \mathcal{P}_i(\lambda-1) + (1-\eta) |\mathcal{Y}_i(\lambda)|^2 \quad (25)$$

where $\mathcal{Y}_i(\lambda)$ is the frequency-domain version of $y_i(k)$ having length N (FDW) and the power spectrum $|\mathcal{Y}_i(\lambda)|^2$ is obtained by taking the absolute square of each element of $\mathcal{Y}_i(\lambda)$.

In S605, Tracking of the minimum: The processing circuitry tracks the minimum of the noisy observation power spectrum by averaging the past values, that is $$\mathcal{P}_{i,min}(\lambda) = [\mathcal{P}_{i,min}(\lambda-1) < \mathcal{P}_i(\lambda)] \odot \\ \left[ \gamma \mathcal{P}_{i,min}(\lambda-1) + \frac{1-\gamma}{1-\beta}(\mathcal{P}_i(\lambda) - \beta \mathcal{P}_i(\lambda-1)) \right] + \\ [\mathcal{P}_{i,min}(\lambda-1) > \mathcal{P}_i(\lambda)] \odot \mathcal{P}_i(\lambda) \quad (26)$$

where $[\mathcal{P}_{i,min}(\lambda-1) < \mathcal{P}_i(\lambda)]$ term in Eq. (26) represents comparison on element-by-element basis and its resultant vector contains zeros (if condition is false) and ones (otherwise), "$\odot$" denotes the element-by-element multiplication, i.e., Hadamard product and $\mathcal{P}_{i,min}(\lambda-1)$ represents the local minimum of the past noisy observation power spectrum.

In S607, Event-presence probability: For detection of the microseismic event, the processing circuitry compares the ratio of noisy observation power spectrum $P_i(\lambda)$ to its local minimum $P_{i,min}(\lambda)$ with a frequency-dependent threshold $\delta$. The ratio is defined as $$\mathcal{S}_i(\lambda) = \mathcal{P}_i(\lambda) \oslash \mathcal{P}_{i,min}(\lambda) \quad (27)$$

where "$\oslash$" denotes the element-by-element division. Next, the event presence probability $\mathcal{I}_i(\lambda)$ is updated as $$\mathcal{I}_i(\lambda) = \alpha_p \mathcal{I}_i(\lambda-1) + (1-\alpha_p)[\mathcal{S}_i(\lambda) > \delta)] \quad (28)$$

where $[\mathcal{S} \mathcal{S}_i(\lambda) > \delta)]$ term in Eq. (28) represents a comparison of each element in $\mathcal{S}_i(\lambda)$ with the threshold $\delta$ and its resultant is a vector with zeros (if condition is false) and ones (otherwise). $\alpha_p$ is a mixing parameter.

In S609, Smoothing factor: The processing circuitry calculates the time-frequency smoothing factor as $$\alpha_s = \alpha_d + (1-\alpha_d) \mathcal{I}_i(\lambda) \quad (29)$$

5) S611, Update of the noise spectrum estimation: Finally, the processing circuitry updates the estimation of the noise power spectrum, $\mathcal{N}_i(\lambda)$ according to $$\mathcal{N}_i(\lambda) = \alpha_s \mathcal{N}_i(\lambda-1) + (1-\alpha_s) |\mathcal{Y}_i(\lambda)|^2 \quad (30)$$

Note that all of the above used constants, $\eta$, $\gamma$, $\beta$, $\alpha_p$ and $\alpha_d$ lie between 0 and 1 and can be found out experimentally.

To find the noise autocorrelation estimate, i.e., $$c_{ww,i}^k(-L+1), \ldots, c_{ww,i}^k(-L+1, \ldots, c_{ww,i}^k(L-1),$$

the noise power spectrum estimate (Eq. (30)) is converted to time-domain. The processing circuitry populates the noise correlation matrix within CEW as, $$P_{ww,i}(k) = \begin{bmatrix} c_{ww,i}^k(0) & c_{ww,i}^k(1) & c_{ww,i}^k(2) & \ldots & c_{ww,i}^k(n-1) \\ c_{ww,i}^k(1) & c_{ww,i}^k(0) & c_{ww,i}^k(1) & \ldots & c_{ww,i}^k(n-2) \\ c_{ww,i}^k(2) & c_{ww,i}^k(1) & c_{ww,i}^k(0) & \ldots & c_{ww,i}^k(n-3) \\ \vdots & \vdots & \vdots & \vdots & \vdots \\ c_{ww,i}^k(n-1) & c_{ww,i}^k(n-2) & c_{ww,i}^k(n-3) & \ldots & c_{ww,i}^k(0) \end{bmatrix} \quad (31)$$

The processing circuitry may continue to determine noise correlation elements for windows of length L until the end of a trace is reached (YES in S613). In S615, the processing circuitry may determine the noise correlation matrix for a trace I by averaging correlations for each window (length L). In S617, the processing circuitry may improve the correlation estimate by stacking the correlations estimate of the adjacent traces, as done in Eq. (24).

Figure 7:
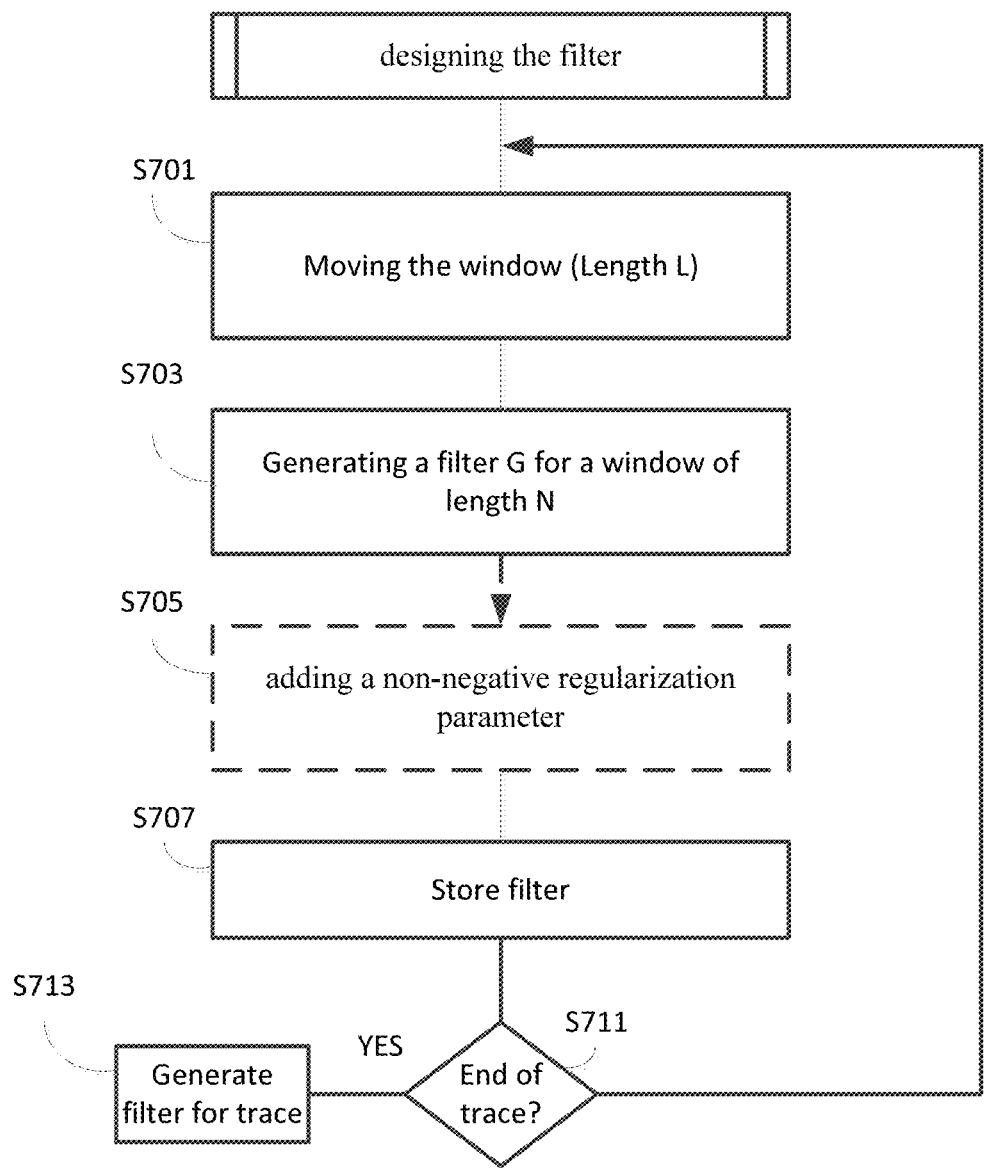
FIG. 7 is a flowchart for designing the filter.

FIG. 7 is a flowchart for structuring the filter. Since the noisy observation signals are non-stationary, a solution is to segment the signal into quasi-stationary short segments of length N. In S703, the processing circuitry determines a filter $G_i(k)$ for a window of length N. The processing circuitry continues to determine filters while moving a sliding window of length L (steps S701, S707). In addition, the correlation matrixes $P_{yy}$ and $P_{ww}$ may be determined in a sliding window of length L>N. A filter $G_i(k)$ may be determined for each correlation matrix as determined over a sliding window of length L until the end of the trace is reached (YES in S711). In some embodiments, in S713, a filter $G_i(k)$ may be determined for the trace based on correlation matrixes that have been averaged over the sliding windows of length L.

Hybrid Correlation

In the case when the correlation is calculated from a single trace, the number of samples used to estimate the correlations may be limited. In some embodiments, in S705, a regularization (non-negative scalar) parameter, $\xi$, may be introduced in the design to increase the robustness of the calculation $$G_{i\xi}(k) = [I_N - P_{ww,i}(k)][P_{yy,i}(k) + \xi O_N]^{-1}, \quad (32)$$

where $O_N$ is an N×N matrix of all ones. Let $\hat{\xi} = \sigma_x^2 / \lambda$, then, in S701, S703, S705, obtain $$G_{i\xi}(k) = I_N - \tilde{P}_{ww,i}(k)[SNR(\tilde{P}_{xx,i}(k) + \hat{\xi} O_N) + \tilde{P}_{ww,i}(k)]^{-1}, \quad (33)$$

and its corresponding filter for the noise is given as $$H_{i\xi} = I_N - G_{i\xi}(k). \quad (34)$$

Although an additional term $\xi O_N$ is introduced in the filters, one can find out that the new filters $G_{i\xi}(k)$ and $H_{i\xi}(k)$ still satisfy the features of Eqs. (16) and (17). The addition of the regularization constant decreases the sensitivity of the filter gain on the data. This is due to the scarcity of the samples used to calculate the correlation matrices.

Although the design of a filter $G_i(k)$ has been described as steps of determining an observation correlation matrix (S403), determining a noise correlation matrix (S405) and determining a filter (S407), a filter may be determined from the observation correlation matrix and the noise correlation matrix in conjunction with the movement of the two sliding windows (window of length W and window of length L).

EXAMPLE IMPLEMENTATIONS

In this section, the robustness of the disclosed system is applied to synthetic, pseudo-real and field data sets. Since the system is without any specific assumption on noise, two exemplary implementations, correlated and uncorrelated noise, are described.

FIG. 8 depicts the synthetic data set generated using a minimum-phase wavelet (microseismic source signature) having center frequency of 5 Hz. It is assumed that 50 receivers are placed on the surface. Furthermore, a sampling frequency of 1 kHz is used with a constant medium velocity. Testing revealed that values of $\eta$, $\gamma$, $\beta$, $\alpha_p$ and $\alpha_d$ are 0.85, 0.998, 0.85, 0.2, and 0.95, respectively.

Figure 10:
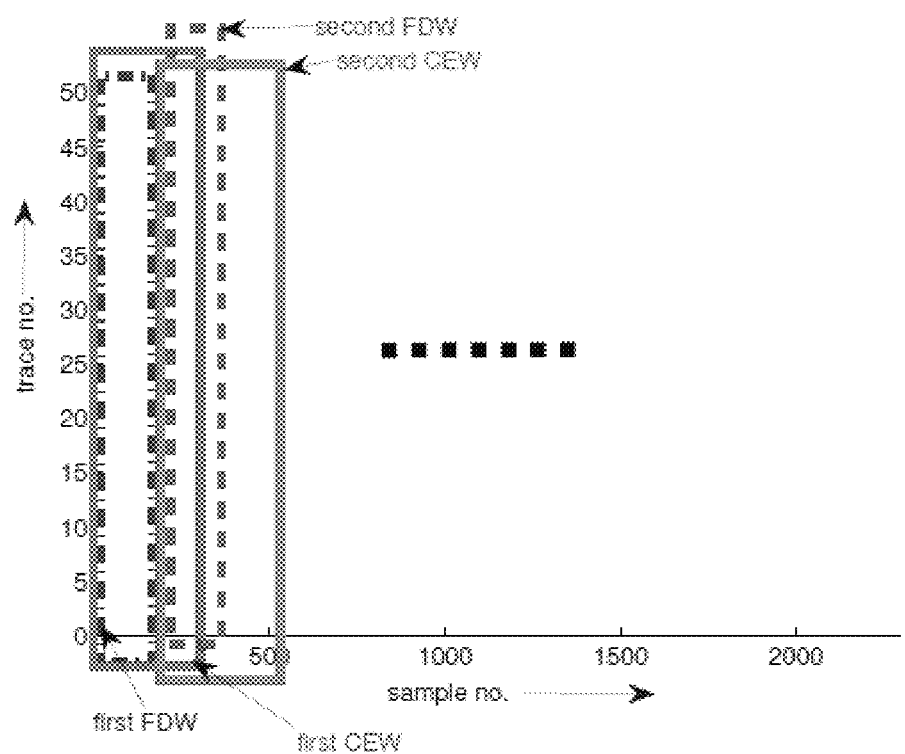
FIG. 10 illustrates the correlation estimate window (CEW) and filter design window (FDW). For illustration, only sliding windows, first FDW/CEW and second FDW/CEW, are shown. Both windows move in a sliding fashion until they cover all the data to calculate $P_{yy,i}(k)$ and $P_{ww,i}(k)$.
Figure 11A:
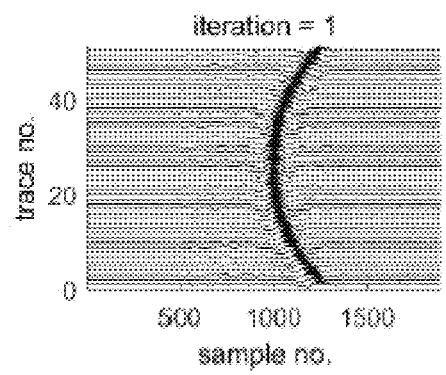
FIGS. 11A, 11B, 11C, 11D illustrates the denoised synthetic data using individual correlations estimate (white Gaussian noise case). The SNR after iteration 1, 2, 3 and 4 is 8.4 dB, 9.2 dB, 10.1 dB and 10.4 dB, respectively.
Figure 11B:
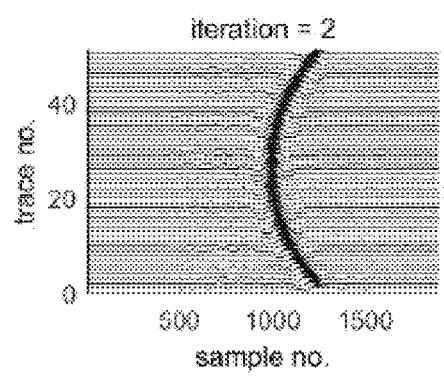
Figure 11C:
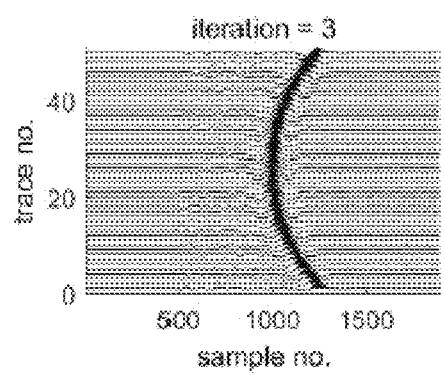
Figure 11D:
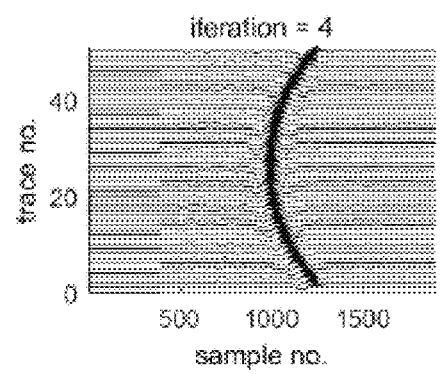

The original traces are contaminated with two kinds of noise, white Gaussian noise and correlated noise, as shown in FIG. 9A and FIG. 9B, respectively. The SNR of the noisy observation is set to −6 dB. The difficulty in picking the microseismic event is obvious. The concept of FDW and CEW is depicted in FIG. 10. $P_{ww,i}(k)$ and $P_{yy,i}(k)$ are calculated in a sliding window fashion (like the first and second CEW/FDW in the figure). For demonstration purposes, only two sliding windows are shown, these windows slide forward in a similar fashion. The step size for both windows is equal to N The value of $\xi$ used in all the results is 1 (using simulations).

The noise is estimated as explained above. Note here that a lower threshold value for detecting a microseismic event gives higher confidence in the detection of the event and hence, avoids potential event distortion. However, there is a chance that a microseismic event may be falsely detected. For example, in some regions, setting the threshold value too low may result in an indication that an event is detected, when in actuality these regions do not contain an event. In most cases, this detection of false events due to overestimation of noise will not likely have much effect on the denoised data set. The microseismic event threshold value used is set as $$\delta = \begin{cases} 2, & 1 \le \lambda \le F \\ 5, & F \le \lambda \le f_s/2 \end{cases} \quad (35)$$

where F is the frequency bin that corresponds to frequency of 100 Hz. Higher value of threshold is used for frequencies above 100 Hz due to the fact that the microseismic event is in the range of 100 Hz. $f_s$ denotes the sampling frequency used while calculating the short-time power spectrum of the noise. This sampling frequency used in the experiments is set to 1 kHz for all the data sets regardless of the frequency at which the data is actually sampled.

The disclosed system is applied on the synthetic data set contaminated with white Gaussian noise and denoised traces are shown in FIGS. 11A, 11B, 11C, 11D (using individual correlations estimate). The SNR of the denoised traces after iteration 1, 2, 3 and 4 is 8.4 dB, 9.2 dB, 10.1 dB and 10.4 dB, respectively. Improvement can be observed after each iteration.

Figure 12A:
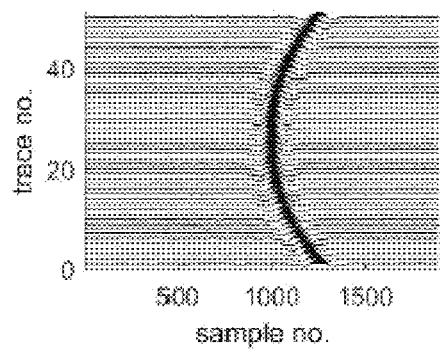
FIGS. 12A, 12B, 12C, 12D illustrate the denoised synthetic data after iteration 4: (a) Individual correlations estimate (white noise), (b) Averaged correlations estimate (white noise), (c) Individual correlations estimate (correlated noise), (d) Averaged correlations estimate (correlated noise)
Figure 12B:
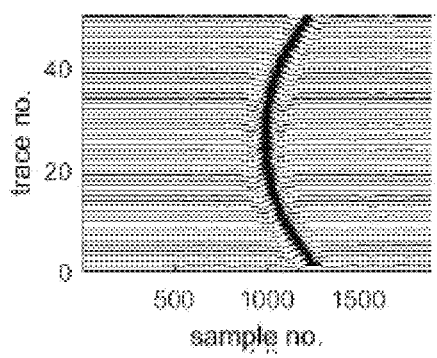
Figure 12C:
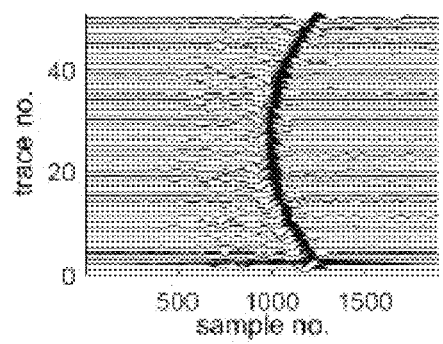
Figure 12D:
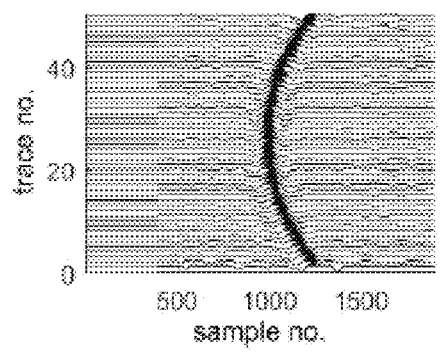
Figure 13A:
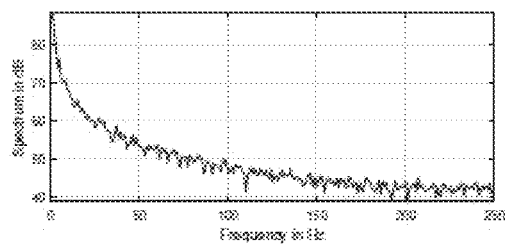
FIGS. 13A, 13B, 13C illustrate the correlated noise specifications (a) Spectrum, (b) Autocorrelation. (c) SNR of denoised data versus ratio of FDW to CEW size.
Figure 13B:
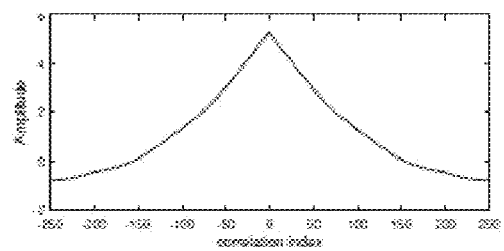
Figure 13C:
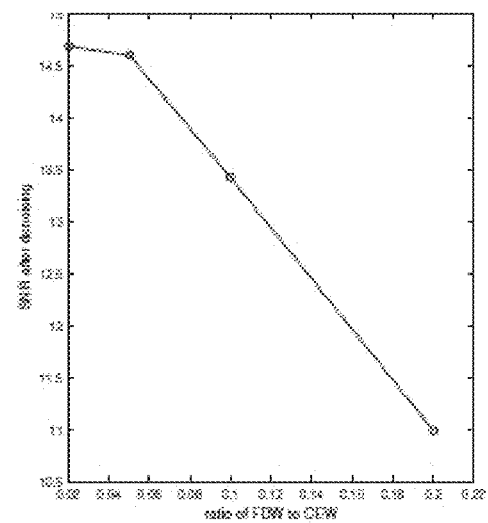
Figure 14A:
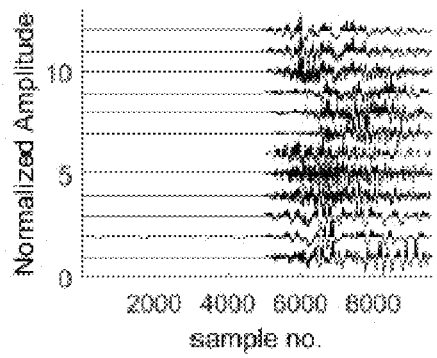
FIGS. 14A, 14B, 14C, 14D illustrate the (a) Real earthquake data set. (b) Real earthquake data with added correlated noise (SNR=−1 dB), (c) Denoised data set using individual correlations estimate (SNR=5:7 dB), (d) Denoised data set using stacked correlations estimate (SNR=6:2 dB)
Figure 14B:
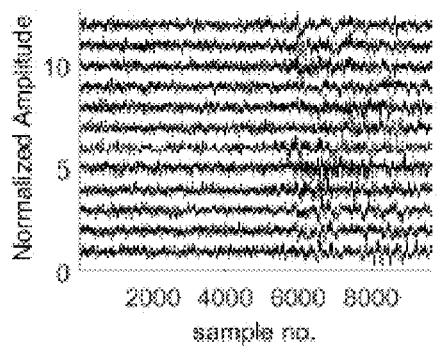
Figure 14C:
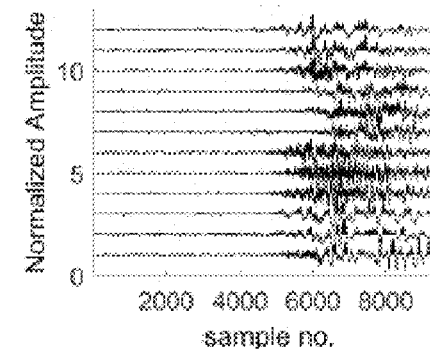
Figure 14D:
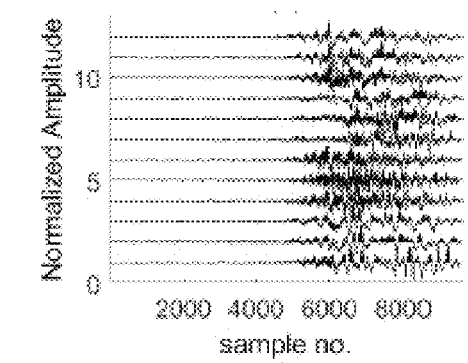

The denoised traces in the presence of white and correlated noise are shown in FIGS. 12A, 12B, 12C, 12D. As depicted from these figures, the denoising result is shown only after iteration number 4. In particular, FIG. 12A shows individual correlations estimate (white noise). FIG. 12B shows averaged correlations estimate (white noise). FIG. 12C shows individual correlations estimate (correlation noise). FIG. 12D shows averaged correlations estimate (correlated noise). The results show that the disclosed system is also efficient in the presence of correlated noise. FIGS. 13A and 13B, respectively, show the spectrum and its correlation function (autocorrelation) of the correlated noise used to test the filter. To generate this noise, white Gaussian noise is filtered through the impulse response of a geophone. See Hons, M. S. and Stewart, R. R., 2006, Transfer functions of geophones and accelerometers and their effects on frequency content and wavelets. *CREWES Research Report*, 18, incorporated herein by reference in its entirety. As can be seen in FIG. 13C, the denoising result is improved using stacked correlations estimate.

FIG. 13C shows the SNR of the denoised data versus the ratio of windows for the white Gaussian noise case (individual correlations estimate). It confirms that if the size of FDW increases, then the SNR decreases due to the estimation errors in correlation matrices. In the experiments, the FDW/CEW ratio may be 0:1 since taking a shorter FDW does not increase the SNR significantly; however, the computational time will increase. The sizes of the CEW and FDW are taken as 500 samples and 50 samples, respectively.

For showing consistency in performance, another real data set used for testing the disclosed system, is shown in FIG. 14. This microseismic data is obtained from IRIS (Incorporated Research Institutions for Seismology). The event dated $23^{rd}$ of June, 2014 in Rat islands (with a magnitude of 7.0.), which is a volcanic group of islands in the Aleutian Islands in southwest Alaska. The sampling frequency for this data set is 40 Hz ($f_s$ used for noise estimation is the same as the previously 1000 Hz). The data comes from four 3C sensors. The noise-less and noisy data (corrupted with geophone filtered noise and called as pseudo-real data set) are depicted in FIGS. 14A and 14B, respectively (for compactness showing three components on the same figure). FIG. 14A shows real earthquake data set. FIG. 14B shows real earthquake data with added correlated noise (SNR=−1 dB). The denoised traces using the individual and stacked correlations estimate are depicted in FIGS. 14C and 14D, respectively. FIG. 14C shows denoised data set using individual correlations estimate (SNR=5.7 dB). FIG. 14D shows denoised data set using stacked correlation estimate (SNR=6.2 dB). About 6.7 dB improvement in SNR is achieved with trace by trace denoising and 7.2 dB improvement with averaging over the traces.

The performance of the disclosed system is compared with other popular denoising methods such as the wavelet decomposition, the bandpass filtering, and the empirical mode decomposition and results are summarized in Table I. For comparison, the worst case scenario is taken; that is, the microquake data set with added geophone-filtered noise (correlated). For the wavelet decomposition based denoising, 'wden' function present in the Matlab's wavelet toolbox is used. Various wavelet basis functions are tested on the pseudo-real data set and coif5 wavelet is selected for comparison based on its best performance as compared to other wavelets. See Daubechies, I., 1992, *Ten Lectures on Wavelets*. Society for Industrial and Applied Mathematics; and Mallat, S., 1989, A theory for multiresolution signal decomposition: the wavelet representation. *IEEE Transactions on Pattern Analysis and Machine Intelligence*, 11, 674-693, each incorporated herein by reference in their entirety. For thresholding, soft rigrsure method of Matlab is used. Another well-known method for denoising is the empirical mode decomposition. See Rilling, G., Flandrin, P., Gonalves, P., and Lilly, J., 2007, Bivariate Empirical Mode Decomposition. *IEEE Signal Processing Letters*, 14, 936-939, incorporated herein by reference in its entirety. This method has an advantage of deriving basis function from the observed data. It can be seen from Table I that the disclosed system is superior to the other methods in terms of all the metrics used for comparison including the mean square error, the mean absolute error, the signal-to-noise ratio, the peak signal-to-noise ratio, and the maximum correlation coefficient.

TABLE 1

Mean Square Error (MS), Mean Absolute Error (MA), Signal-to-Noise Ratio (SNR), Peak-Signal-to-Noise Ratio (PSNR), and maximum Correlation Coefficient (CC) from the pseudo-real data experiment using bandpass filtering, decomposition, empirical mode decomposition and the proposed method.

| Method for denoising | MS | MA | SNR (dB) | PSNR (dB) | CC |
| --- | --- | --- | --- | --- | --- |
| Noisy data set | 0.0225 | 0.1199 | −0.2695 | 12.3525 | 0.4916 |
| Wavelet decomposition | 0.0076 | 0.0617 | 4.5464 | 21.0719 | 0.7972 |
| Bandpass filtering | 0.0191 | 0.1069 | 0.5492 | 17.0747 | 0.6826 |
| Empirical mode decomposition | 0.0169 | 0.0677 | 1.0788 | 17.6043 | 0.5185 |
| Proposed method using individual correlations estimate | 0.0066 | 0.0550 | 5.7060 | 21.6653 | 0.8502 |
| Proposed method using stacked correlations estimate | 0.0046 | 0.0350 | 6.2160 | 22.6565 | 0.8920 |

Figure 15:
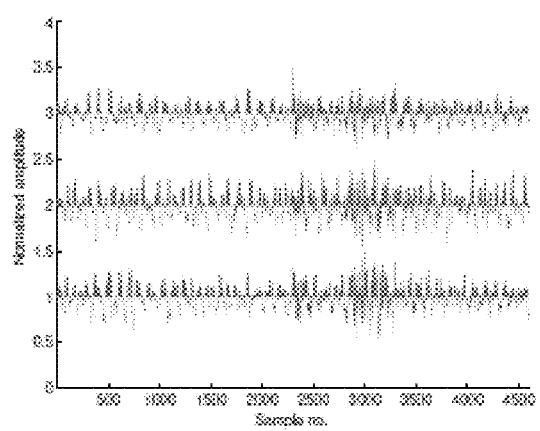
FIG. 15 illustrates the field data set (real microearthquake data set)
Figure 16A:
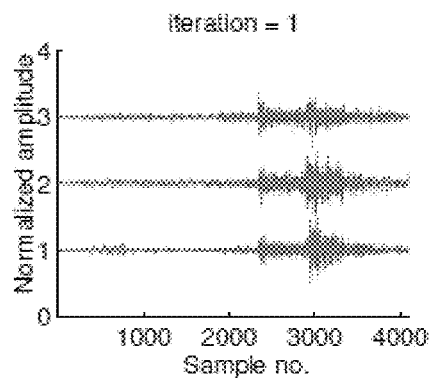
FIG. 16A, 16B, 16C, 16D illustrate denoised field data using individual correlations estimate.
Figure 16B:
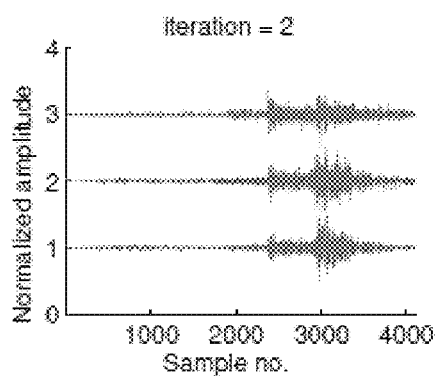
Figure 16C:
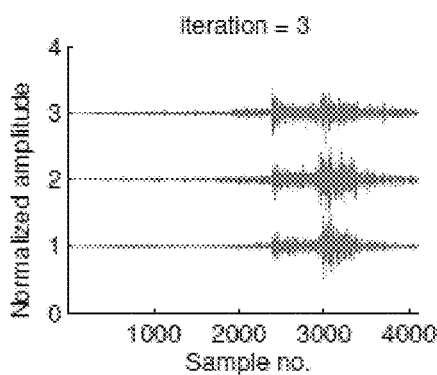
Figure 16D:
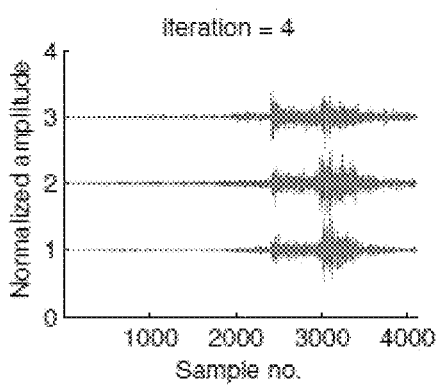
Figure 17A:
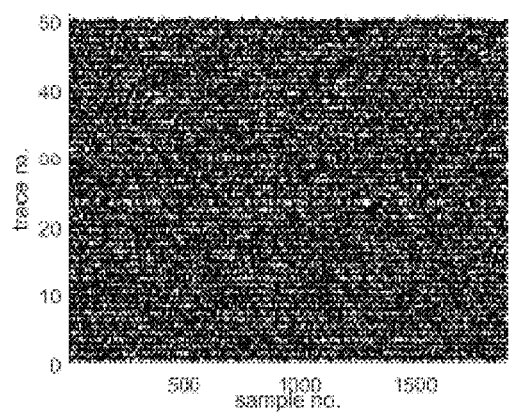
FIGS. 17A and 17B illustrate the noise removed from (a) synthetic data, (b) real data.
Figure 17B:
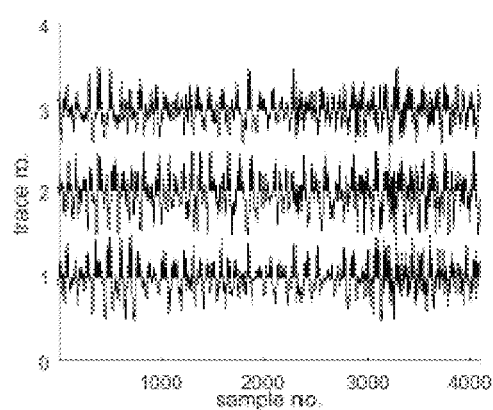

Finally, the disclosed system is also tested on real microseismic data set shown in FIG. 15. These waveforms are obtained from the IRIS website. The event occurred in Central Alaska with a magnitude of 2:0. The receivers/sensors were placed on the surface. The recording station was IU.COLA: College Outpost, Alaska, USA. The event occurred on the 27 Jan. 2017. FIG. 8 shows the normalized amplitude and mean subtracted version of this three component data set. The sizes of windows used for both individual and stacked correlation estimate are set to FDW=50 samples and CEW=500 samples. FIGS. 16A, 16B, 16C, 16D show denoised field data using individual correlations estimate. The figures show that the disclosed system performs equally well for this real microquake data set. A consistency in performance of the disclosed system is clearly visible through the different tests used in this paper. Thus, the usefulness of this filter in these applications is established. The noise removed from synthetic data is shown in FIG. 17A, and from real data is shown in 17B.

Numerous modifications and variations of the present invention are possible in light of the above teachings. It is therefore to be understood that within the scope of the appended claims, the invention may be practiced otherwise than as specifically described herein.

The invention claimed is:

1. An enhanced oil recovery and $CO_2$ storage method, comprising:
   fracking a geologic formation containing an oil and/or gas reservoir;
   injecting $CO_2$ into the fracked geologic formation to produce oil and/or gas from the geological formation;
   during the injecting or during the fracking, monitoring microseismic activity by:
      recording, by a combination of surface-mounted geophones and geophones placed in boreholes, wherein the surface-mounted geophones are disposed in a star pattern with radial arms extending from a center, seismic observation data;
      iteratively performing, by processing circuitry:
      estimating an observation correlation matrix by:
         dividing the seismic observation data into data segments of length N,
         determining correlation elements by sliding a correlation estimation window (CEW) of length L and a filter design window (FDW) of length N, N<L, over the seismic observation data, where N and L are natural numbers, and
         summing correlations of a data element in one of the data segments of length N for each data segment in the CEW to obtain the observation correlation matrix as a matrix of N x N observation correlation elements;
      estimating a noise correlation matrix using the seismic observation data converted to a frequency-domain while sliding the CEW and the FDW over the seismic observation data to obtain a matrix of N×N noise correlation elements;
      structuring a linear filter for each CEW based on a difference between the observation correlation matrix and the noise correlation matrix;
      recovering seismic signals by applying the linear filter to the seismic observation data; and
      displaying the seismic observation data and the recovered seismic signals as an indication of the microseismic activity; and
   permanently storing the $CO_2$ in the geologic formation.

2. The method of claim 1, wherein the estimating the noise correlation matrix includes
   for each CEW, converting N data elements of the seismic observation data into frequency domain and estimating a power spectrum with the converted seismic observation data, wherein the power spectrum is determined by taking the absolute square of each of the N elements of the converted seismic observation data;
   tracking a minimum of the power spectrum by averaging past values of the power spectrum;
   comparing a ratio of the power spectrum to a local minimum of the power spectrum with a frequency-dependent threshold to obtain an event-presence probability;
   calculating a time-frequency smoothing factor based on the event-presence probability; and
   updating the estimated power spectrum using the smoothing factor.

3. The method of claim 1, wherein the geophones are three component geophones, and
   the dividing includes dividing the seismic observation data for each of three components of respective three component geophones.

4. The method of claim 3, wherein the estimating the observation correlation matrix includes determining the average of the correlations estimated from adjacent traces received from the three component geophones.

5. The method of claim 3, wherein the dividing seismic observation data includes dividing seismic observation data that is non-stationary.

6. The method of claim 1, wherein the linear filter is a Wiener filter, and the structuring the filter includes adding a non-negative regularization parameter.

7. The method of claim 1, wherein a ratio of the length N of the FDW and the length L of the CEW in the sliding during the estimating an observation correlation matrix and the estimating a noise correlation matrix is 0.1.

8. The method of claim 1, wherein the estimating the observation correlation matrix includes sliding the CEW to partially overlap with each other.

9. The method of claim 1, wherein the estimating the observation correlation matrix is performed using L—N data elements.

10. The method of claim 1, wherein the sliding includes moving both the FDW and the CEW after estimating the noise correlation matrix.

\* \* \* \* \*